United States Patent [19]

Sawyer

[11] Patent Number: 5,475,862
[45] Date of Patent: Dec. 12, 1995

[54] IMPROVED REGISTRATION IN CELLULAR RADIO TELECOMMUNICATIONS SYSTEMS

[75] Inventor: Francois Sawyer, St-Hubert, Canada

[73] Assignee: Telefonaktiebolaget L M Ericsson, Stockholm, Sweden

[21] Appl. No.: 6,048

[22] Filed: Jan. 19, 1993

[51] Int. Cl.$^6$ ...................................................... H04Q 7/20
[52] U.S. Cl. .................... 455/33.1; 455/54.1; 455/56.1; 379/59
[58] Field of Search ................................. 455/33.1, 54.1, 455/54.2, 56.1, 34.1; 379/59, 60, 63

[56] References Cited

U.S. PATENT DOCUMENTS

| | | | |
|---|---|---|---|
| 4,775,999 | 10/1988 | Williams | 455/34.1 |
| 4,905,301 | 2/1990 | Kropp et al. | |
| 5,054,110 | 10/1991 | Comroe et al. | 455/33.1 |
| 5,101,500 | 3/1992 | Marui | 455/33 |
| 5,109,527 | 4/1992 | Akerberg | 455/33.2 |
| 5,129,097 | 7/1992 | Suzuki et al. | 455/33.2 |
| 5,142,654 | 8/1992 | Sonberg et al. | 379/59 |
| 5,305,466 | 4/1994 | Taketsugu | 455/33.1 |

FOREIGN PATENT DOCUMENTS

| | | |
|---|---|---|
| 0344989A3 | 12/1989 | European Pat. Off. . |
| 0538014A3 | 4/1993 | European Pat. Off. . |
| 2243976 | 11/1991 | United Kingdom . |

OTHER PUBLICATIONS

Stanley T. S. Chia, "Location Registration and Paging in a Third Generation Mobile System," 4 Oct. 1991, British Telecom Technology Journal vol. 9, No. 4.

Primary Examiner—Reinhard J. Eisenzopf
Assistant Examiner—Thanh Le
Attorney, Agent, or Firm—Nash & Samra

[57] ABSTRACT

A method and system for registering mobile stations within a cellular radio telecommunications system. A registration confirmation message, initial voice channel designation message or initial traffic channel designation message may include system parameter values to enable the mobile station to ensure that it is currently registered in the system in which it is currently located.

32 Claims, 3 Drawing Sheets

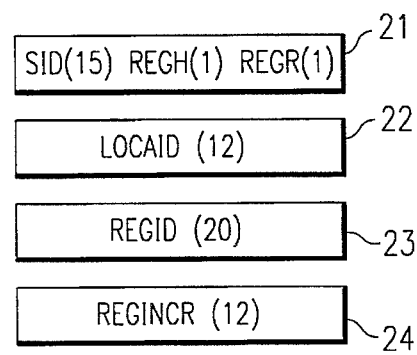
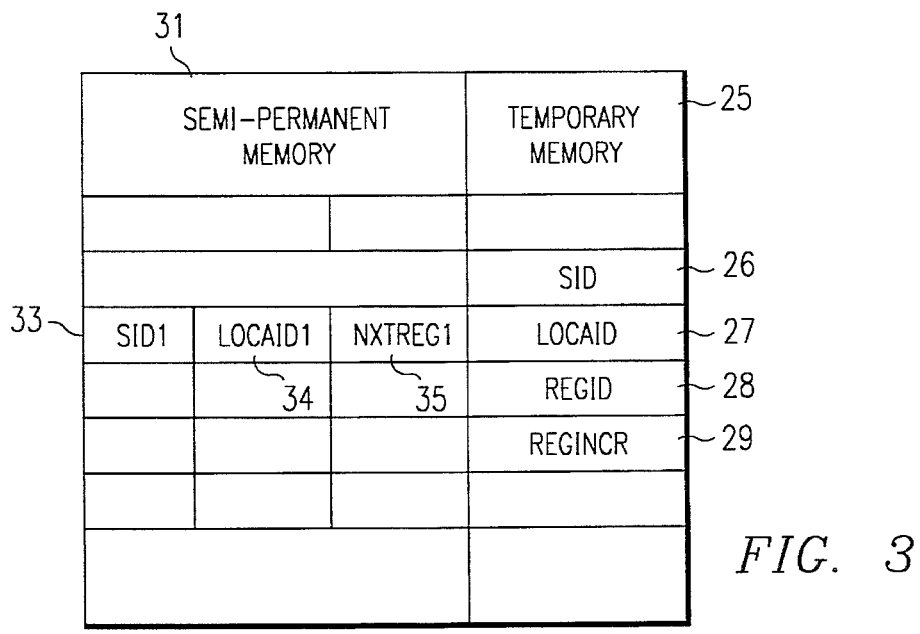
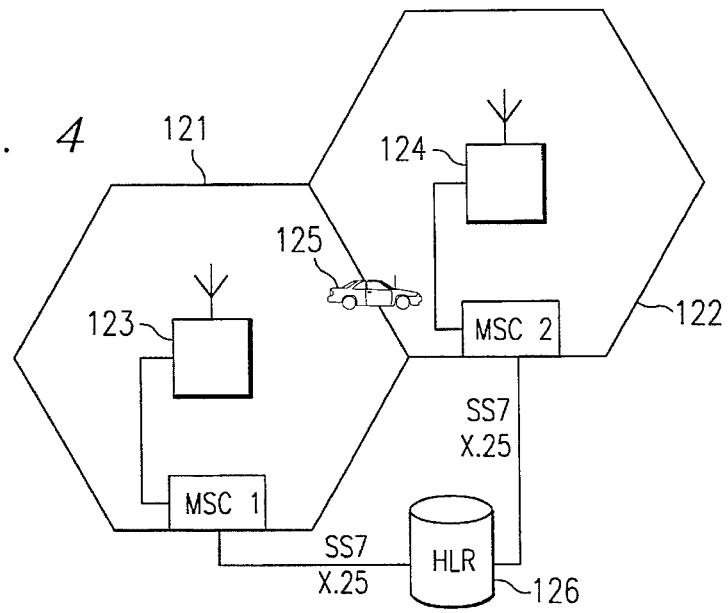

IMPROVED REGISTRATION IN CELLULAR RADIO TELECOMMUNICATIONS SYSTEMS

BACKGROUND OF THE INVENTION

1. Field of the Invention

The invention relates to cellular radio telecommunications systems, and in more particular, to the registration of mobile stations within such systems.

2. History of the Prior Art

In cellular radio telecommunications systems in which mobile stations move from one cell to another and from one system to another, it is critically important to be able to identify the current location of a mobile in order to direct calls to it. This has conventionally been accomplished by the process of mobile registration in which a mobile station registers its presence as it enters the service area of a particular mobile switching center (MSC), and that MSC forwards such registration information to the home location register (HLR) of that mobile station. The HLR maintains in its database a record of the current location of the mobile station at all times so that if a call is received by the mobile station at any system within the network, access of the HLR of that mobile will yield its current location so that the call can then be completed to the mobile at that location.

In a cellular radio system, mobile stations maintain communications with the geographically distributed fixed radio base stations within the system on two different radio links: a voice channel assigned to the mobile by the MSC over which voice communication takes place and a control channel over which data communication between the mobile station and the base station takes place. Such data communication includes registration requests by the system, registration access by the mobile, registration confirmation messages by the system, channel assignment signals, and many other messages. Each base station in a system periodically transmits a plurality of messages over its control channel referred to as the Overhead Message Train (OMT) which includes certain values established for each system. These values include a system identification number (SID), which identifies the particular system, a location area identification number (LOCAID), which identifies a subdivision (i.e., location area) within the system within which the base station is located, a registration ID number (REGID), which is essentially a clock signal, and a registration increment signal (REGINCR), which is a value indicative of the time until the next periodic registration which will be required of the mobile for activity supervision purposes. The sum of the values of the REGID and REGINCR equals a next registration (NXTREG) value which is the time value at which the next registration of the mobile is required by the system.

The data received from the system by a mobile station is very important for the maintenance of communication between the two. Mobile stations may contain within them a first memory area within which each parameter received from a system is immediately stored and a second area within which is semi-permanently stored certain parameter values indicative of the system in which the mobile station is currently registered and with which it is communicating. When a particular parameter value is received on the Overhead Message Train, that value is compared with the corresponding semi-permanently stored value to determine whether the mobile is still operating in the system indicated in its semi-permanent memory.

Another basic concept inherent in the maintenance of communication between a mobile station and a cellular radio telephone system is that of "rescan". Because of the criticality of the control data which the mobile station receives from the system, it is necessary to optimize the quality of the communication link connecting the base station and the mobile station. Thus, a mobile station frequently rescans all of the control channels available to it and selects the channel with the highest quality transmission as the one over which it will communicate with the system. When a mobile station is rescanning and selecting from a plurality of control channels being broadcast by base stations which form a part of the same system or subdivision thereof as indicated by identical values for SID and LOCAID, respectively, i.e. base stations being controlled by the same MSC or subdivision thereof, the MSC and mobile station stay in continuous connection with one another. However, problems begin to arise when a mobile station is operating in a border region between two areas served by different MSCs or two subdivisions of the same MSC area. In such cases, a mobile station may become alternately connected to control channels which are associated with different MSCs or subdivisions of an MSC and thereby create confusion as to the location of the mobile within the system.

For example, a mobile located on the border of two systems may be registered in one system, and its registration information stored in its HLR accordingly, then upon deterioration of the signal in the control channel to which it is connected, rescan and be connected to a control channel associated with a different system. Upon receiving the OMT information from the new system, the mobile would detect new system parameter values and would then attempt to reregister in that system. To do that, the mobile would start a process of rescanning all control channels. It might select a control channel on the old system and send the registration message to that old system. That registration information would then be updated in its home location register, and the registration confirmed by the old system. Thereafter, after receiving a registration confirmation message, this mobile may again rescan and be connected to a control channel on the new system. Upon receipt of the registration confirmation message, the mobile station would have stored in its semi-permanent memory the system parameter values of the new system as detected prior to the attempt to register. This leaves the mobile lost within the system since any new calls received for that mobile would be directed to the old system, with which it is now registered, while it is actually in communication with a base station located within the new system.

The system of the present invention obviates the problems associated with mobile registration in regions near the border of two or between more contiguous systems or contiguous subparts of a system and prevents such confusion.

SUMMARY OF THE INVENTION

In one aspect, the present invention includes the transmission of system parameter information in the message which is sent from a system to a mobile confirming its registration as well as another message assigning a voice channel to the mobile. This enables the mobile station to store that information in its memory of system registration data so that in the event a system which is confirming access or assigning a voice channel is different from the one in which the mobile last registered, the registration data can be corrected and the mobile will register according to the new data thus avoiding inaccurate registration information being stored in the HLR of the mobile.

In another aspect, the present invention includes system and method for the registration of mobile stations within a cellular radio telecommunications system. System parameter values are broadcast on the control channel of a base station and received on the control channel at a mobile station. The received system parameter values are stored within the memory of the mobile station. A system access message is broadcast from a mobile station to a base station and a system acknowledgement message transmitted by the base station is received at the mobile station. The system acknowledgement message includes system parameter values. The system parameter values stored within the memory of the mobile station are updated with the system parameter values received in the system acknowledgement message in response to the receipt of those values.

In a further aspect, the system acknowledgement message comprises a registration confirmation message.

BRIEF DESCRIPTION OF THE DRAWINGS

For a more complete understanding of the present invention and for further objects and advantages thereof, reference may now be had to the following description taken in conjunction with the accompanying drawings in which:

FIG. 2 is a diagrammatic representation of a subset of the Overhead Message Train information sent by a base station to a mobile station;

FIG. 3 is a chart illustrating registration parameters stored within the memory of a mobile station;

FIG. 4 is a block diagram illustrating the operation of a mobile station within the area bordering two adjacent radio telephone communication systems.

DETAILED DESCRIPTION

Figure 1:
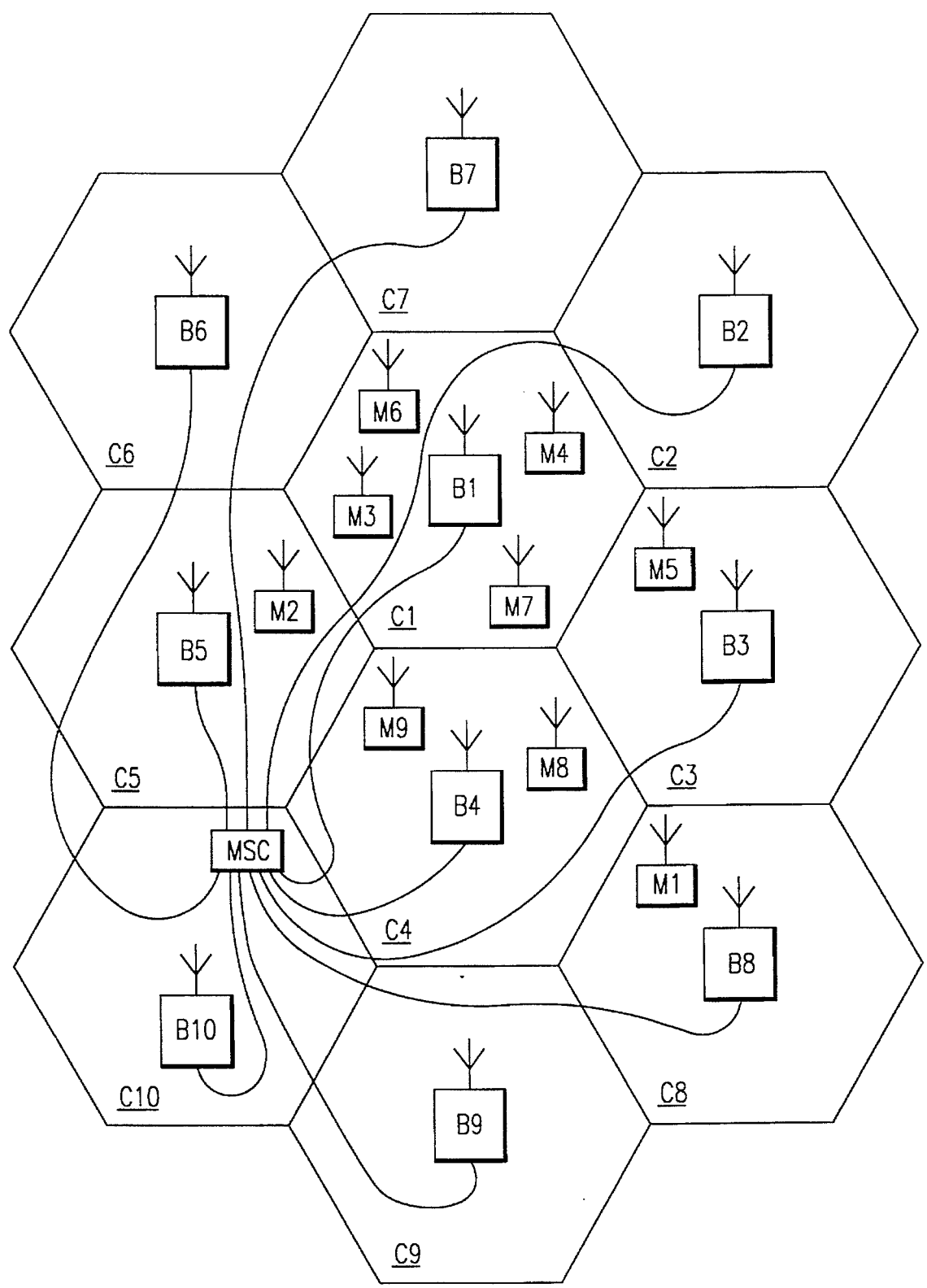
FIG. 1 is a pictorial representation of a cellular radio communications system including a mobile switching center, a plurality of base stations, and a plurality of mobile stations.

Referring first to FIG. 1, there is illustrated a conventional cellular radio communications system of the type to which the present invention pertains. In FIG. 1, an arbitrary geographic area may be divided into a plurality of contiguous radio coverage areas, or cells C1–C10. While the system of FIG. 1 is illustratively shown to include only 10 cells, it should be clearly understood that in practice, the number of cells will be much larger.

Associated with and located within each of the cells C1–C10 is a base station designated as a corresponding one of a plurality of base stations B1–B10. Each of the base stations B1–B10 include a transmitter, receiver, and base station controller as are well known in the art. In FIG. 1, the base stations B1–B10 are illustratively shown at the center of each of the cells C1–C10, respectively, and are equipped with omni-directional antennas. However, in other configurations of a cellular radio system, the base stations B1–B10 may be located near the periphery, or otherwise away from the centers of the cells C1–C10 and may illuminate the cells C1–C10 with radio signals either omni-directionally or directionally. Therefore, the representation of the cellular radio system of FIG. 1 is for purposes of illustration only and is not intended as a limitation on the possible implementations of a cellular radio system within which the system of the present invention is implemented.

With continuing reference to FIG. 1, a plurality of mobile stations M1–M10 may be found within the cells C1–C10. Again, only 10 mobile stations are shown in FIG. 1 but it should be understood that the actual number of the mobile stations will be much larger in practice and will invariably greatly exceed the number of base stations. Moreover, while none of the mobile stations M1–M10 may be found in some of the cells C1–C10, the presence or absence of the mobile stations M1–M10 in any particular one of the cells C1–C10 should be understood to depend, in practice on the individual desires of the mobile stations M1–M10 who may roam from one location in the cell to another or from one cell to an adjacent cell or neighboring cell, and from one cellular radio system served by one MSC to another such system served by a different MSC. In particular, the present invention is concerned with problems associated with mobile stations which operate within contiguous border cells of adjacent systems served by different MSCs or located within different subdivisions (location areas) of an MSC.

Each of the mobile stations M1–M10 is capable of initiating or receiving a telephone call through one or more of the base stations B1–B10 and a mobile switching center MSC. A mobile switching center MSC is connected by communication links, e.g., cables, to each of the illustrative base stations B1–B10 and to the fixed public switched telephone network (PSTN), not shown, or a similar fixed network which may include an integrated services digital network (ISDN) facility. The relevant connections between the mobile switching center MSC and the base stations B1–B10, or between the mobile switching center MSC and the PSTN or ISDN, are not completely shown in FIG. 1 but are well known to those of ordinary skill in the art. Similarly, it is also known to include more than one mobile switching center in a cellular radio system network and to connect each additional mobile switching center to a different group of base stations and to other mobile switching centers via cable or radio links. The current location data for each of the mobile stations shown in FIG. 1 is maintained within a database of a home location register (HLR) which may be associated with a particular MSC. The data stored for each mobile includes the identity of the MSC serving the area within which the mobile is currently located. The HLR also stores data related to the subdivision of the MSC service area where a mobile subscriber is presently located.

Each of the cells C1–C10 is allocated a plurality of voice or speech channels and at least one access or control channel consisting of a forward control channel (FOCC) from the base station to the mobile station and a reverse control channel (RECC) from the mobile station to the base station. The control channel is used to control or supervise the operation of mobile stations by means of information transmitted to and received from those units. Such information may include incoming call signals, outgoing call signals, page signals, page response signals, location registration signals, voice channel assignments and maintenance instructions. The control or voice channels may operate either in an analog or digital mode or a combination thereof.

Although not shown specifically in FIG. 1, the cells in a cellular radio system served by particular MSCs may be organized into groupings to enable the more efficient utilization of the system resources. For example, there may be defined within the system a plurality of location areas with each location area including one or more individual cells and being identified by a location area identification number (LOCAID). These location areas define subdivisions of an MSC service area as mentioned above.

As discussed above in the background section, in order to provide terminating call services to mobile stations operating within a cellular radio communication network, the networks maintain a record of location data for each subscriber within its associated home location register (HLR). The data stored in the HLR normally includes the identity of the MSC where the mobile station was last known to be located. Thus, calls received by the network for the mobile station can be routed toward the MSC indicated by the current location data stored in its associated HLR. The location data for each mobile subscriber has conventionally been updated upon any type of access to the system by the mobile station, whether that access was for purposes of registration by the mobile or in response to an attempt to place a call by the mobile. In U.S. patent application Ser. No. 07/797,548, filed Nov. 25, 1991, and entitled "Call Routing in Mobile Telephone Systems" by Sawyer, et al. and assigned to the assignee of the present invention, hereby incorporated by reference, it is suggested that the location data maintained for a mobile subscriber should only be updated in response to registration accesses. This suggested limitation is related to problems associated with the call access procedures defined in the air interface specification specified by EIA/TIA-553 and EIA/TIA IS-54.

The mobile station registration process is controlled by the MSC by means of the data sent to the mobile station by the fixed radio base stations on their forward control channels as part of an Overhead Message Train. Such data is illustrated in FIG. 2 and includes the system identification number (SID) 21, the location area identification number (LOCAID) 22, the registration identification number (REGID) 23, and the registration increment parameter (REGINCR) 24. The SID 21 and the LOCAID 22 are used to define the particular mobile telephone system and its subdivisions, respectively. The subdivisions (location areas) are defined for purposes of increasing the efficiency of location of mobile stations within the system. A particular system as defined by a SID may include of an MSC's service area and, in some cases, more than one MSC service area. A LOCAID may then be used to identify MSC borders independently of SID borders. The REGID acts as a clock within the system for periodic registration while the REGINCR is an indication for the mobile station of the periodicity of the registration process. Mobile stations are instructed by the system to register upon detection of a new system or any part thereof based upon the data transmitted to it over the control channel. That is, a mobile station must register upon the detection of a new SID or a new LOCAID forming part of the data in the Overhead Message Train received on its control channel. Mobile stations are also instructed to register periodically, according to the parameters set forth within the REGID 23 and REGINCR 24 portions of the Overhead Message Train received by it on the control channel. These parameters are set forth in the Overhead Message Train data diagram shown in FIG. 2.

When a mobile station determines that it should register with the system, it stores temporarily within its memory 25 the SID 26, LOCAID 27, REGID 28, and REGINCR 29 values received by it in the Overhead Message Train on the forward control channel it is receiving. It then rescans the available control channels to choose the best channel available to it, this being determined as the control channel with the highest detected signal strength received by the mobile. Following the rescan, the mobile station may then select a control channel that does not carry the stored SID, LOCAID, REGID, and REGINCR if the control channel selected following rescan is being broadcast by a different base station. This can occur when the mobile station is operating on the border between two adjacent base stations forming part of two different systems. A registration access is then sent by the mobile station on the reverse control channel and is received by the fixed radio base station. The base station then transfers the information to the MSC with which it is associated and the MSC informs the HLR of the current location of the subscriber. The MSC also instructs the base station to send a registration confirmation to the mobile station indicating to it that it has then been registered within the system. Each mobile station has a semi-permanent memory 31 which contains entries 33–34 indicating the cellular system and/or the location area in which the mobile most recently registered successfully, along with an associated value NXTREG 35 used to determine when it is scheduled to reregister in that cellular system and/or location area. Upon receiving a registration confirmation message from a system, the mobile station then stores within its semi-permanent memory 31 either the LOCAID and/or the SID. In the event a new SID is stored a next registration (NXTREG) parameter is computed from the REGID and the REGINCR parameters previously received along with the new SID and thereafter stored in the semi-permanent memory 31. The mobile station then again rescans the control channels to ensure that it is operating on the control channel with the highest possible signal strength then available to it.

While the mobile station is in the idle state, it continuously monitors the system parameters broadcast within the Overhead Message Train on the control channel it is receiving. When it determines that a registration access should be sent, it scans the set of defined control channels for the system. If the mobile station is located near the border of two systems controlled by two different MSCs, it may select a control channel from a neighboring MSC as a result of the rescanning process. The registration is then in such a case sent to an MSC other than the one it was intended to be sent to. That MSC then initiates the process of updating the location data for the mobile subscriber in its HLR and then sends a registration confirmation to the mobile station. The mobile station rescans again to select a control channel. If, following this last rescan the mobile station happens to return to a control channel of the MSC to which the registration was initially intended, the mobile station will not detect that the registration access has been sent to a different system. The result of this confusion is that the mobile station then becomes lost within the system and is connected to and being served by an MSC other than the one which its HLR believes it is being served by. Thus, when an incoming call is received by the network intended for the mobile station, it will be sought by the system within the area served by the MSC identified in the registration information and be unable to be located. A less severe problem occurs when the correct MSC is identified in the registration information but an incorrect subdivision of the MSC is indicated. Current means to overcome this problem include paging in all subdivisions of the MSC, however, such actions are highly inefficient and defeat the purpose of having MSC subdivisions.

To prevent loss of mobile stations within the system, one proposed approach is that of broadcasting all relevant system parameters at a high data rate and instructing all mobile stations to read these parameters on the control channels after the rescan process and before sending its registration access to the system. This approach is fully supported by the EIA/TIA IS-54 standard specification and the only drawback is that such data transmission requires a substantial part of the forward control channel capacity. This capacity must be used as economically as possible since it supports a large amount of traffic for the paging of mobile stations, registration confirmations, traffic channel designations and other such functions. The system of the present invention accomplishes the same goal but uses much less of the forward control channel capacity.

Referring again to FIG. 3, the memory within the mobile station contains both a temporary region 25 in which data received on the forward control channel from the system is immediately stored and a different area 31 within which information is semi-permanently stored by transferring data from the temporary area 25 into the semi-permanent area 31 once registration confirmations have been received by the mobile station from the system.

In the system of the present invention, the relevant system parameters (SID, LOCAID, and/or REGID and REGINCR from which an updated value of NXTREG is calculated for a mobile station) can be included in the registration confirmation sent to the mobile station by the system. The mobile station receives this new data and updates its internal data accordingly. In this way, the storing of semi-permanent values for SID, LOCAID and NXTREG by the mobile station would not necessarily be in accordance with that received on the channel where the mobile station was initially idle, but rather, according to the control channel that has actually received and processed the registration access. That control channel is the one which belongs to the MSC that has updated the subscriber's location data in the HLR. Thus, this eliminates the ambiguity that presently exists in the registration process and ensures that under the circumstances where a mobile is operating in a border area served by two adjacent MSCs, the mobile will not become lost and unable to be located within the system.

The system of the present invention whereby system data is included in the registration confirmation messages sent to the mobile station by the system and then subsequently processed by the mobile station to ensure that it is properly registered, can be included as optional features within the system. For example, data fields included in the registration confirmation messages can indicate the number of system parameters that are included in the message. The system data could, for example, be included in all registration confirmation messages. Alternatively, it could be included in all registration confirmations sent by control channels serving cells located near MSC borders. It could also be included only in a registration confirmation sent to a mobile station that has accessed a system or subdivision thereof for a first time as detected by the MSC's internal logic based upon data stored within it.

In addition, the same system data (SID, LOCAID, REGID and REGINCR) could be added to the initial voice channel or the initial digital traffic assignment sent to a mobile station upon call initiation. This feature would be particularly useful when a mobile station accesses an MSC for the first time by sending another type of access than registration. Other types of system data could be sent to a mobile station upon registration confirmation, initial voice channel designation or initial traffic channel designation. It would thus be possible to indicate to a mobile station which SID or LOCAID it is permitted to access. In this way, the system would ensure that a mobile station being part of an indoor cellular system will not access the outdoor cellular system inadvertently.

Referring next to FIG. 4, there is shown an illustrative diagram illustrating two service areas 121 and 122 controlled by different MSCs, MSC1 and MSC2. Within the service area 121 served by MSC1, there is illustrated a base station 123 broadcasting certain control parameters within the Overhead Message Train of its control channel. These include the parameters SID1, LOCAID1, REGID1, and REGINCR1. Similarly, service area 122 served by MSC2 includes a base station 124 which is broadcasting certain system parameters on its control channel. These parameters include SID2, LOCAID2, REGID2, and REGINCR2. A mobile station 125 is shown to be operating in the border region between the two service areas 121 and 122 and stores within its memory a set of system parameters which are being received periodically on the Overhead Message Train of the control channel to which it is currently tuned. The location data for the mobile station 125 is stored in an HLR 126, those data including the identity of the MSC within which the mobile station is currently registered. The HLR 126 receives data from both MSC1 and MSC2 via signalling links operating for instance over Signalling System number 7 protocols or X. 25 protocols depending on the particular circumstances.

As shown in FIG. 4, the mobile station 125 listens to the control channel it is receiving which has the highest measured signal strength as of its last rescan of the available channels. Radio propagation characteristics are such that the mobile station 126 may frequently change its tuning from one control channel to another depending upon signal quality of the channels it is receiving. The mobile station 126 regularly detects system parameters broadcast in the Overhead Message Trains of the control channels which it receives. The mobile station 126 will decide to register if any one of the following conditions exist:

(a) SID(MS) is≠SID(CC); or (b) LOCAID(MS) is≠LOCAID(CC); or (c) NXTREG<REGID (CC).

That is, since the mobile station is constantly storing in its temporary memory values of the registration parameters received on the Overhead Message Train of the control channel it is currently receiving, it compares those values with the values stored in its semi-permanent memory so that it can then determine whether or not it is appropriate to reregister based upon both location parameters and time parameters.

After a mobile station decides to register and before it sends its registration message on the reverse control channel which it is then currently receiving, the mobile station rescans and selects a control channel. It may be the same control channel it was just receiving or a different control channel depending upon the quality of the signal being broadcast on the different control channels available to it at the time it rescans. The registration message sent by the mobile station is sent on the new control channel which it is receiving after its rescan.

After sending a registration message on the new control channel, the mobile station receives a registration confirmation message on the same new control channel and stores either the LOCAID or the SID and NXTREG values in its semi-permanent memory based upon the last values it received on a control channel. In many cases, where the mobile station is operating on the border area between two systems, the mobile station may store registration values broadcast to it by the old control channel it was previously receiving before it broadcasts its own registration message. After receiving the registration confirmation message on the new control channel, the mobile station may rescan and return to the old control channel if the signal quality on that channel is higher than that on the new control channel on which it sent its registration message and on which it received its registration confirmation message. If the old control channel it has returned to belongs to MSC1 and the new control channel belongs to MSC2, the mobile station then considers itself registered in MSC1. However, since MSC2 has received the registration message from the mobile, it considers that it is serving the mobile station at that time. Thus, MSC2 then informs the HLR 126 of such via the signalling link and the HLR stores information sent to it by MSC2 service area 122. The HLR 126 then informs MSC1 that MSC1 is no longer serving the mobile station via data sent over the links between them.

This sequence of occurrences results in great confusion within the system and potentially loses the mobile station for call delivery.

A similar situation may happen in the event the mobile station is initially idle in service area 121 served by MSC1 and seeks to initiate a call. In the event the mobile station rescans and selects a control channel being broadcast by base station 124, the mobile station would then send an origination on the new control channel, i.e. one associated with base station 124 and MSC2, and would store the SID, LOCAID and NXTREG values associated to MSC1 and earlier broadcast by base station 123 upon initial voice channel designation (IVCD) or the initial traffic channel designation (ITCD).

Mobile stations operating within a cellular radio system routinely send system access messages which may include both registration access messages as well as call access messages. The latter may occur as a result of either call origination or page response by the mobile.

As set forth above, the system of the present invention includes incorporation within any type of system acknowledgement message, including a registration confirmation message, an initial voice channel designation (IVCD) message, or an initial traffic channel designation (ITCD) message, from the system on the control channel to the mobile station, one or more system parameter values which may include SID, LOCAID, and/or values for calculation of a NXTREG value. These system parameter values would then be stored by the mobile station so that it had an accurate indication of the actual location in which it was currently registered and which the system believes it was operating within. This inclusion of additional data in a system acknowledgement message such as a registration confirmation message, IVCD or ITCD, broadcast by the system would ensure that the mobile station would immediately correct any inaccurate information stored within its memory and ensure that it does not become lost within the system.

Figure 5:
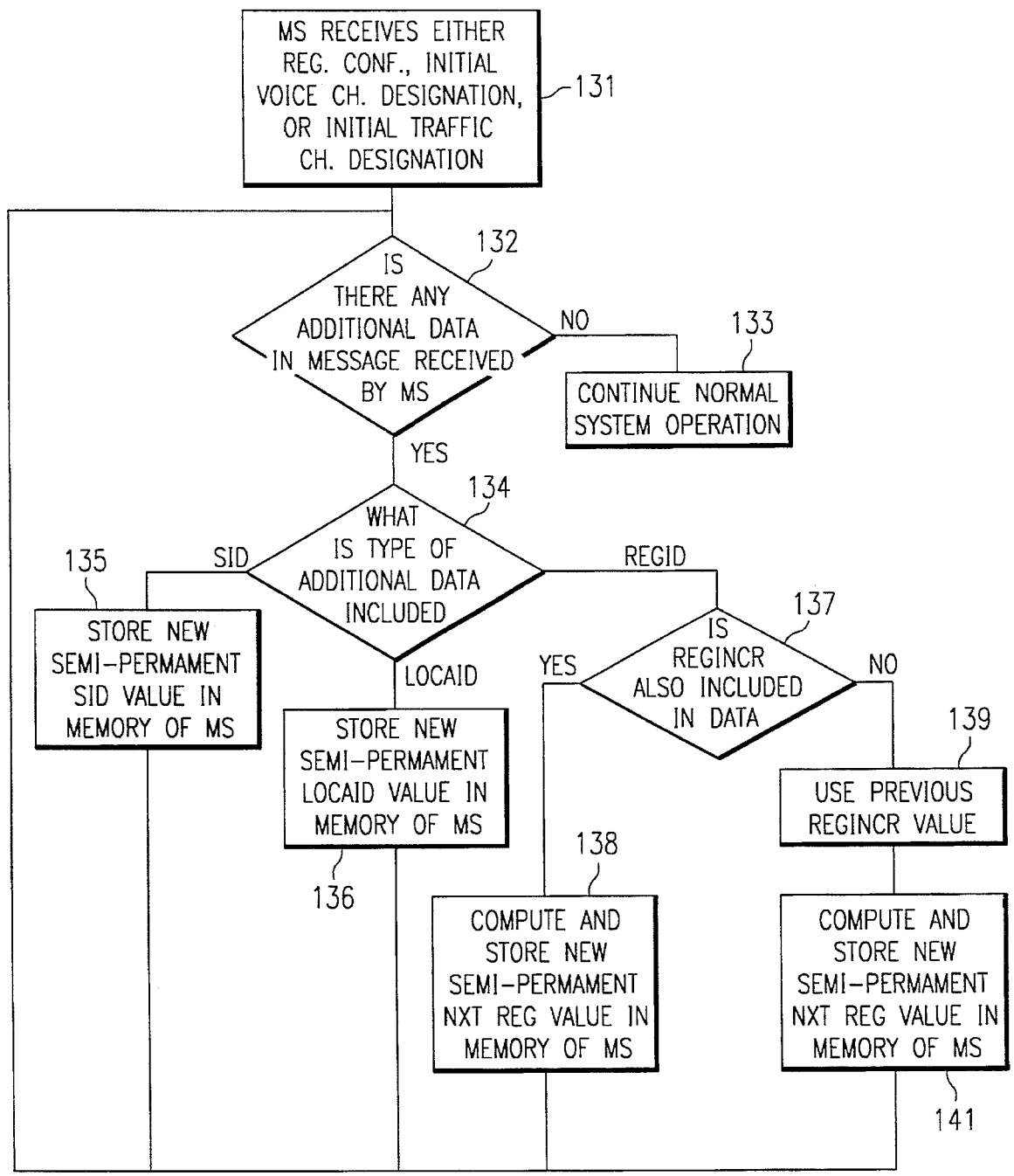
FIG. 5 is a flow chart illustrating a sequence of registration information exchange in accordance with the principles of the present invention.

Referring next to FIG. 5, there is shown a flow chart illustrating a sequence of steps within the operation of the system of the present invention. The system begins at 131 in which the mobile station receives either a registration confirmation message, initial voice channel designation, or initial traffic channel designation within the messages sent on the control channel to which it is currently tuned. At 132, the mobile station determines whether or not there is any additional data present in the message received by the mobile station. If not, the system moves to 133 where it continues normal system operation. If, however, at 132, the system detects that there is additional data contained within the message received by the mobile station, it moves to 134 at which it analyzes and determines what type of additional data is included. If, the additional data was a SID parameter (as determined at 134), the system moves to 135 and stores new semi-permanent SID value in the semi-permanent memory of the mobile station. If, the system determines at 134 that the additional data included LOCAID value, it moves to 136 and stores a new semi-permanent LOCAID value in the semi-permanent memory of the mobile station. If, in addition, the system determines at 134 that the values included in the additional data contained in the messages received by the mobile station included a REGID value, the system moves to 137 and determines whether or not a REGINCR value is also included in the additional data. If so, the system moves to 138 at which it computes and stores a new semi-permanent NXTREG value in the semi-permanent memory of the mobile station. If, however, at 137, the system determines that there was no REGINCR value included in the additional data in the message received by the mobile station, it moves to 139 and uses the previous REGINCR value stored within the mobile station and thereafter to 141 where it computes and stores the new semi-permanent NXTREG value in the semi-permanent memory of the mobile station. This sequence of operation which is based upon the inclusion of system parameter values in the registration confirmation message, the initial voice channel designation message, or initial traffic channel designation message broadcast on the control channel of a system to a mobile station, ensures that the data stored within the memory of the mobile station corresponds to the data stored within the system and eliminates any possibility of the mobile station becoming lost within the system by virtue of the so called rescan problem inherent in the operation of mobile stations within the border region adjacent to two different systems or parts thereof.

As can be seen from the above description, the present invention enables a mobile station to be constantly aware of the system within which it has registered regardless of the fact that it may rescan and receive registration confirmation on a different system than the one in which it had previously registered. This enables optimized use of the system resources for location of mobiles within a system and avoids the loss of the mobile due to rescanning onto a contiguous system unknowingly.

It is believed that the operation and construction of the present invention will be apparent from the foregoing description. While the method and apparatus shown and described has been characterized as being preferred, obvious changes and modifications may be made therein without departing from the spirit and scope of the invention as defined in the following claims.

What is claim is:

1. A method for the registration of mobile stations operating within a radio telecommunications system comprising the steps of:

broadcasting a first system parameter value on a control channel of said system;

receiving said first system parameter value at one of said mobile stations;

storing said first system parameter value within a first memory of said mobile station;

transmitting a system access message from said mobile station to said system;

transmitting in response to said system access message a system acknowledgement message from said system to said mobile station, said system acknowledgment message including a second system parameter value;

storing said second system parameter value within a second memory of said mobile station;

comparing said second system parameter value with said first system parameter value; and transmitting a registration message from said mobile station to said system if said first and second system parameter values are different.

2. The method of claim 1 wherein said system acknowledgement message comprises a registration confirmation message.

3. The method of claim 1 wherein said system acknowledgement message comprises an initial voice channel designation message.

4. The method of claim 1 wherein said system acknowledgement message comprises an initial traffic channel designation message.

5. The method of claim 1 wherein said step of storing said second system parameter value includes:

analyzing said system acknowledgement message to determine which particular system parameter value is included in said message.

6. The method of claim 1 wherein said first memory comprises a temporary memory in said mobile station and said second memory comprises a semi-permanent memory in said mobile station.

7. The method of claim 1 wherein each of said first and second system parameter values comprises a LOCAID value.

8. The method of claim 1 wherein each of said first and second system parameter values comprises a SID value.

9. The method of claim 1 wherein said system access message comprises a registration access message.

10. The method of claim 1 wherein said system access message comprises a call access message.

11. The method of claim 1 wherein said system acknowledgement message further includes an indication of the type of said second system parameter value.

12. The method of claim 1 in wherein said system comprises a plurality of location areas each including at least one cell and wherein said second system parameter value is included only in system acknowledgement messages transmitted in cells on the border between two of said location areas.

13. The method of claim 1 wherein said second system parameter value is included in said system acknowledgement message only if said mobile station was not registered in the location which received said access message.

14. The method of claim 1 wherein at least one other system parameter value is transmitted along with each of said first and second system parameter values.

15. The method of claim 14 wherein each of said first and second parameter values comprises a SID value and said at least one other system parameter value comprises a REGID, REGINCR or LOCAID value.

16. The method of claim 14 wherein said system acknowledgement message includes an indication of the number and type of system parameter values included in said system acknowledgement message.

17. An apparatus for the registration of mobile stations operating within a radio telecommunications system comprising:

means for broadcasting a first system parameter value on a control channel of said system;

means for receiving said first system parameter value at one of said mobile stations;

means for storing said first system parameter value within a first memory of said mobile station;

means for transmitting a system access message from said mobile station to said system;

means for transmitting in response to said system access message a system acknowledgement message from said system to said mobile station, said system acknowledgment message including a second system parameter value;

means for storing said second system parameter value within a second memory of said mobile station;

means for comparing said second system parameter value with said first system parameter value; and means for transmitting a registration message from said mobile station to said system if said first and second system parameter values are different.

18. The apparatus of claim 17 wherein said system acknowledgement message comprises a registration confirmation message.

19. The apparatus of claim 17 wherein said system acknowledgement message comprises an initial voice channel designation message.

20. The apparatus of claim 17 wherein said system acknowledgement message comprises an initial traffic channel designation message.

21. The apparatus of claim 17 wherein said means for storing said second system parameter value includes:

means for analyzing said system acknowledgement message to determine which particular system parameter value is included in said message.

22. The apparatus of claim 17 wherein said first memory comprises a temporary memory in said mobile station and said second memory comprises a semi-permanent memory in said mobile station.

23. The apparatus of claim 17 wherein each of said first and second system parameter values comprises a LOCAID value.

24. The apparatus of claim 17 wherein each of said first and second system parameter values comprises a SID value.

25. The apparatus of claim 17 wherein said system access message comprises a registration access message.

26. The apparatus of claim 17 wherein said system access message comprises a call access message.

27. The apparatus of claim 17 wherein said system acknowledgement message includes an indication of the type of said second system parameter value.

28. The apparatus of claim 17 wherein said system comprises a plurality of location areas each including at least one cell and wherein said second system parameter value is included only in system acknowledgement messages transmitted in cells on the border between two of said location areas.

29. The apparatus of claim 17 wherein said second system parameter value is included in said system acknowledgement message only if said mobile station was not registered in the location which received said access message.

30. The apparatus of claim 17 wherein at least one other system parameter value is transmitted along with each of said first and second system parameter values.

31. The apparatus of claim 30 wherein each of said first and second parameter values comprises a SID value and said at least one other system parameter value comprises a REGID, REGINCR or LOCAID value.

32. The apparatus of claim 30 wherein said system acknowledgement message includes an indication of the number and type of system parameter values included in said system acknowledgement message.

* * * * *